United States Patent [19]
Ferralli

[11] Patent Number: 5,861,191
[45] Date of Patent: Jan. 19, 1999

[54] BACTERIOSTATIC COATING OF POLYMERIC CONDUIT

[75] Inventor: Michael W. Ferralli, Fairview, Pa.

[73] Assignee: Technology Licensing Company, Pittsburgh, Pa.

[21] Appl. No.: 606,965

[22] Filed: Feb. 26, 1996

[51] Int. Cl.[6] .............................. B05D 3/02; B05D 1/04; B05D 1/02

[52] U.S. Cl. .................... 427/316; 427/230; 427/236; 427/374.4; 427/286; 427/422; 427/475

[58] Field of Search ................................ 427/2.3, 2.28, 427/230, 236, 374.4, 393.5, 458, 316, 318, 422, 286, 475, 476

[56] References Cited

U.S. PATENT DOCUMENTS

| | | | |
|---|---|---|---|
| 3,584,656 | 6/1971 | Assendelet et al. | 138/141 |
| 4,183,974 | 1/1980 | Coucher et al. | 427/28 |
| 4,243,699 | 1/1981 | Gibson | 427/183 |
| 4,505,613 | 3/1985 | Koga | 405/154 |
| 4,592,920 | 6/1986 | Murtfeldt | 427/2.3 |
| 4,791,965 | 12/1988 | Wynn | 138/146 |
| 5,066,518 | 11/1991 | Klingen | 427/236 |
| 5,087,153 | 2/1992 | Washburn | 405/154 |
| 5,094,847 | 3/1992 | Yazaki et al. | 424/618 |
| 5,186,972 | 2/1993 | Williams et al. | 427/2.28 |
| 5,192,027 | 3/1993 | Delmer et al. | 239/542 |
| 5,234,713 | 8/1993 | Watanabe et al. | 427/233 |
| 5,271,974 | 12/1993 | Upchurch | 428/34.4 |
| 5,332,160 | 7/1994 | Ruskin | 239/542 |
| 5,451,424 | 9/1995 | Solomon et al. | 427/2.3 |
| 5,464,650 | 11/1995 | Berg et al. | 427/2.3 |
| 5,470,603 | 11/1995 | Staniforth et al. | 427/2.14 |
| 5,501,873 | 3/1996 | Ferralli | 427/195 |
| 5,505,992 | 4/1996 | Ferralli | 427/236 |
| 5,607,417 | 3/1997 | Batich et al. | 604/890.1 |

FOREIGN PATENT DOCUMENTS 6099136  4/1994  Japan .

*Primary Examiner*—Diana Dudash
*Attorney, Agent, or Firm*—Titus & McConomy

[57] ABSTRACT

A conduit coating which is made by covering a surface thereof with a polymeric material which may include an additive made of bacteriostatic, bacteriocidal, fungicidal, fungistatic or mildew-suppressing material.

21 Claims, 2 Drawing Sheets

BACTERIOSTATIC COATING OF POLYMERIC CONDUIT

FIELD OF THE INVENTION

The present invention relates to an improved polymeric conduit, and specifically to an improved polymeric conduit having a coating or overcoating made with a bacteriostatic, bacteriocidal, fungicidal, fungistatic or mildew-suppressing material.

BACKGROUND OF THE INVENTION

Typically polymeric-lined conduits such as tubes, pipes and innerducts are manufactured by extruding a thermoplastic polymer through a suitable die. These conduits are used in a diversity of applications, including as water or other fluid conduits, as protective sheaths for telecommunications cabling or other types of cable including electrical wiring, as sanitary sewer piping, and as household and industrial runoff tubing. In virtually every use, and especially in the transportation of consumable products such as potable water or medical supplies, there is a concern that bacteria, fungus or mildew may colonize the conduit interior and pose a threat to the purity of the transported species. In addition, there is a concern that such colonization may pose a threat to the integrity of the cable itself due to the production of products which may degrade the cable, or to workers who may be required to access the cable and thus become exposed to the colonizing species. Although bacteriocidal, fungicidal and mildew-resisting agents that may be generally added to polymers, and bacteriostatic polymers are available, they have not been adapted for use to line the interior or overcoat the exterior of polymeric conduit to eliminate the problems posed by such impurities to the material transported by the conduit, to the persons who handle the conduit, or to the conduit itself.

Accordingly, it is an object of this invention to provide a material and method of coating polymeric conduit with a material which exhibits bacteriostatic, bacteriocidal, fungicidal and mildew suppressing properties to reduce the potential for colonization of such species on the conduit.

It is also an object of the present invention to provide polymeric conduit having an interior and/or exterior surface with bacteriostatic, bacteriocidal, fungicidal and mildew suppressing properties to inhibit the growth of such species in the material occupying the conduit.

It is also an object of this invention to provide a coating for polymeric conduit which will release bacteriostatic, bacteriocidal, fungicidal, and mildew-suppressing agents into the material occupying the conduit.

It is also an object of this invention to provide a polymeric coating for polymeric conduit which may be compounded with materials known for their bacteriostatic, bacteriocidal, fungicidal and mildew suppressing properties.

SUMMARY OF THE INVENTION

Generally, the present invention provides a material and method for coating the interior surface or overcoating the exterior surface of a polymeric conduit with a material imparting bacteriostatic, bacteriocidal, fungicidal and mildew suppressing properties to the polymeric surface to which it is applied. Preferably the coating material comprises a polymer such as polyethylene, polytetrafluoroethylene, polyurylidine fluoride or a mixture of such materials combined with a substance such as metal-complexed ethylene-diamine-tetra-acetic acid (EDTA), cuprous oxide, cupric oxide, copper, silver or zinc or mixtures and compounds of such substance that impart bacteriostatic, bacteriocidal, fungicidal and mildew suppressing agents to the conduit surface. The coating material may also include a mixture of pigments, stabilizers, lubrication fillers, agents or other additives such as titanium oxide, graphite, silicon, polytetraflouroethylene which impart coloring and/or lubrication properties. The preferred method of applying the coating to the conduit is by hot melt spray-enhanced deposition. Other methods of applying the coating to the conduit include overcoating, co-extrusion or post-extrusion, and electrostatic or impact spray-enhanced deposition. The coating material may alternately be placed on the interior or exterior surface of the conduit in a plurality of continuous or discontinuous strips.

BRIEF DESCRIPTION OF DRAWINGS

FIG. (1) is a perspective view of a conduit exhibiting a coating material formed in accordance with the present invention.

FIG. (2) is a cross sectional view of the conduit formed in accordance with the present invention having a textured coating.

Figure 1:
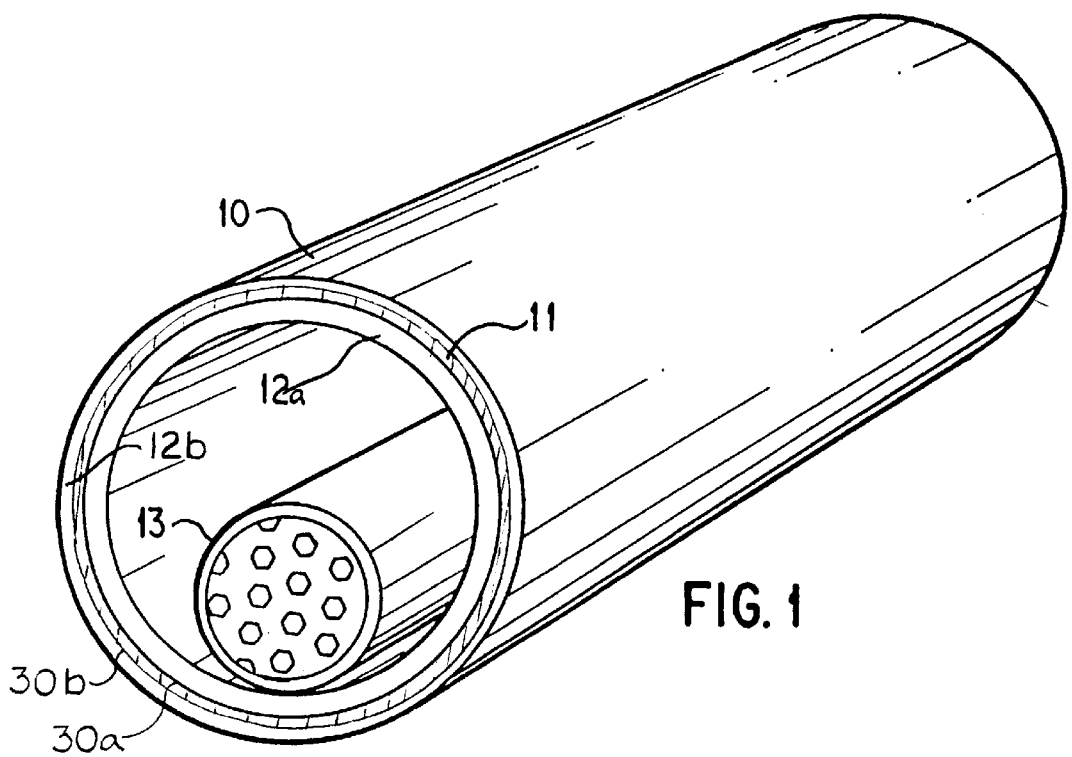
Figure 2:
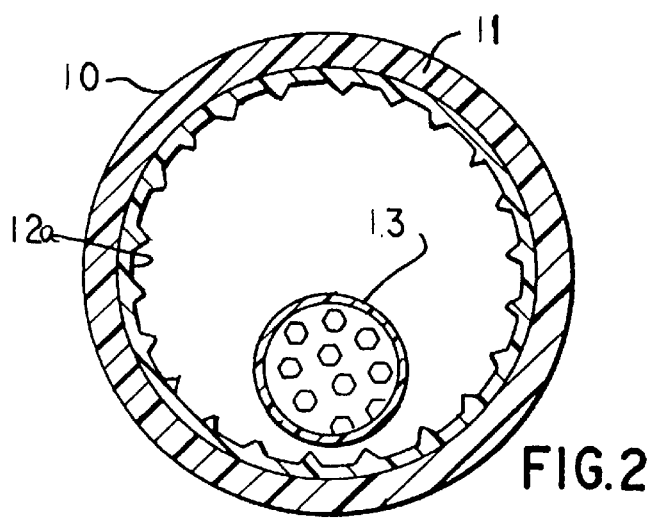

FIG. (3) is a schematic illustration of applying the coating material of the present invention using hot melt spray-enhanced deposition process.

FIG. (4) is an elevation view of the nozzle used for providing the coating material of the present invention in a plurality of ribbon-like strips.

FIG. (5) is a cross-sectional view of a conduit lined with the coating material of the present invention configured in a plurality of ribbon-like strips.

DETAILED DESCRIPTION OF THE PRESENTLY PREFERRED EMBODIMENT

FIGS. (1) and (2) illustrates conduit tubing 10 formed in accordance with the present invention that contains a pull-through fiber optic communications cable 13. Conduit 10 consists of an outer tube 11 which is preferably a thermoplastic polymer such as polypropylene or polyethylene, preferably formed by any conventional extrusion process known in the art. Outer tube 11 has a coating material 12a which is applied to the interior surface 30a of the outer tube 11. The material can alternately be applied as an overcoating 12b to the exterior surface 30b of the outer tube 11. The coating material 12a or 12b comprises a polymer such as polyethylene, polytetrafluoroethylene, polyvinylidine fluoride or a mixture of such materials that is combined with a bacteriostatic, bacteriocidal, fungicidal and mildew suppressing material such as metal-complexed ethylene-diamine-tetra-acetic acid (EDTA), cuprous oxide, cupric oxide, copper, silver, zinc or mixtures and compounds of such metals which contribute to the bacteriostatic, bacteriocidal, fungicidal and mildew suppressing properties of the coating 12a or 12b. The coating 12a or 12b may also include a mixture of pigments, stabilizers, lubrication fillers, or other agents or other additives such as titanium oxide, graphite, silicon, polytetraflouroethylene which impart coloring and/or lubrication properties to the material. The polymeric material in coating 12a or 12b may be thermoplastic or optionally thermoset, and can include conventional commercial paint compounds such as alkyd-enamel or latex formulations. The coating 12a or 12b can be applied to interior surface 30a or exterior surface 30b of the outer tube 11 using hot melt spray-enhanced deposition as described below and in U.S. Pat. No. 5,501,873, which is incorporated herein by reference. Other methods of applying the coating 12a or 12b to the conduit 10 include overcoating, co-extrusion or post-extrusion, electrostatic spray-enhanced deposition as described in U.S. Pat. No. 5,501,873, which is incorporated herein by reference, impact spray-enhanced deposition as described in U.S. patent application Ser. No. 08/379,947 which is incorporated herein by reference, and any other similar application methods known in the art.

Although FIGS. (1) and (2) illustrate a conduit 10 whose cross section is circular, it is to be understood that the conduit 10 may have any desired cross-section, such a square, rectangular, elliptical, triangular or other required shape for desired end use. Further as shown in FIG. (2), the coating 12 may be textured with undulations having inward projecting ribs with cross-sections that take any desired shape including, but not limited to, square, rectangular, circular and polygonal shapes.

Figure 3:
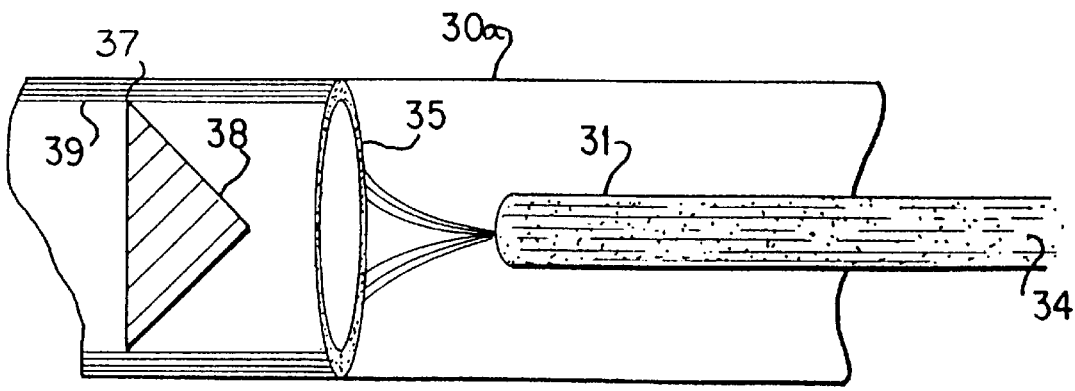
Figure 4:
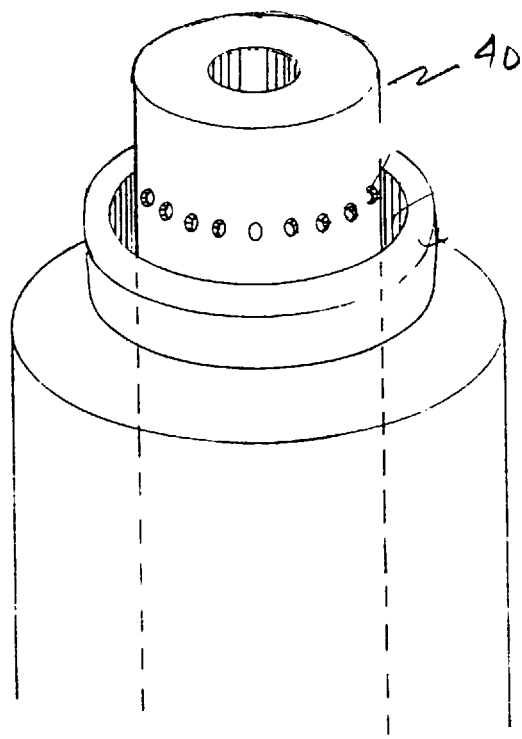
Figure 5:
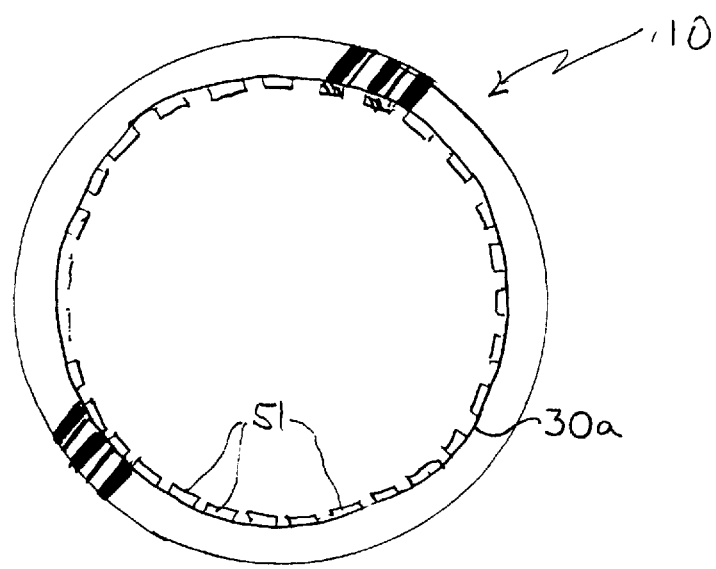

FIG. (3) illustrates a preferred embodiment of the process of coating the interior surface 30a of a conduit 10 previously formed by extrusion using hot melt spray enhanced-deposition. An orificed tube or nozzle 31 containing melted or otherwise fluidized coating material 12a is preferably placed inside the conduit 10 prior to extrusion. The conduit 10 is raised to a temperature at or near its extrusion temperature. The fluidized coating material 12a is forced at temperatures at or above its melting point through the orifices of nozzle 31 by a pump (such as a piston pump—not shown) to dispense the fluidized coating material 12a in a radially symmetric pattern 35 about the interior surface 30a of the conduit 10. Pressures preferably at or above 1500 psi are used to "atomize" the coating material 12a to provide the spray coating. However, because of the polymeric nature of the preferred coating material 12a it is generally not possible to obtain an atomized spray. In this application, the spray is generally as large as short molecular fragmented polymer chains. The polymeric coating material 12a is chemically or physically fused to the interior surface 30a of the conduit 10 due to the elevated temperature of both the conduit 10 and the coating material 12a. Optionally as shown in FIG. 3, a heated plug 38 acts to further fuse the coating material 12a to form a film 39 on the conduit 10 surface. The heated plug 38 may optionally have a contoured edge 37 which is in contact with the film 39 to contour the film 39 with a desired texture.

As shown in FIGS. (4) and (5) and described in U.S. patent application Ser. No. 08/546,018 which is incorporated herein by reference, the coating material 12a or 12b, respectively, may be placed on the interior surface 30a (or exterior surface 30b—not shown) of the conduit 10 in a plurality of continuous or discontinuous ribbon-like strips 51 by use of a nozzle 40 juxtapositioned to interior surface 30a (or exterior surface 30b) of the conduit 10.

While the invention has been described in connection with what is presently considered to be the preferred embodiment, it is to be understood the invention is not to be limited to the disclosed embodiments, but on the contrary is intended to cover various modifications and equivalent arrangements include within the spirit of the scope of the appended claims.

What is claimed is:

1. A method of coating a surface of a conduit, comprising the steps of:
   A. forming a coating substance comprised of a polymeric material in combination with a material for inhibiting the growth of bacteria on said surface;
   B. fluidizing said coating substance by heating said coating substance to a temperature above the melting point of said coating substance;
   C. heating said conduit to a temperature less than the melting points of said coating substance and said conduit;
   D. depositing said fluidized coating substance on a surface of said heated conduit to provide a coating thereover when said surface cools.

2. A method as set forth in claim 1, wherein said coating substance is deposited by spraying.

3. A method as set forth in claim 1, wherein said coating substance is deposited in a plurality of strips.

4. A method as set forth in claim 3, wherein said strips are juxtapositioned along a surface of said conduit.

5. A method as set forth in claim 3, wherein said conduit has a continuous interior surface and wherein said strips are of a length substantially the same as the length of said conduit.

6. A method as set forth in claim 3, wherein said strips are substantially coextensive with said interior surface.

7. A method as set forth in claim 1, wherein said polymeric material is a thermoplastic polymer.

8. A method as set forth in claim 1, wherein said conduit is comprised of a thermoplastic polymer formed by extrusion.

9. A method as set forth in claim 8, wherein said coating substance is deposited onto said conduit by post-extrusion.

10. A method as set forth in claim 8, wherein said coating substance is deposited onto said conduit by overcoating.

11. A method as set forth in claim 1, wherein said coating substance is deposited onto said conduit by hot melt spray deposition.

12. A method as set forth in claim 1, wherein said coating substance is deposited onto said conduit by electrostatic spray deposition.

13. A method as set forth in claim 1, wherein said coating substance is deposited onto said conduit by impact spray deposition.

14. A method as set forth in claim 1, wherein said polymeric material comprises a polymer selected from the group consisting of polyethylene, polytetrafluoroethylene, and polyvinylidene fluoride and mixtures of said polymers.

15. A method as set forth in claim 1, wherein said bacteria-inhibiting material comprises at least one substance selected from the group consisting of metal-complexed ethylene-diamine-tetra-acetic acid (EDTA), cuprous oxide, cupric oxide, copper, silver, and zinc and mixtures or compounds including said bacteria-inhibiting materials.

16. A method as set forth in claim 1, wherein said coating substance is additionally comprised of a material selected from the group consisting of graphite, talc and silicone.

17. A method as set forth in claim 14, including the steps of mixing at least one of said polymers with materials selected from the group consisting of graphite and silicone oils.

18. A method as set forth in claim 1, wherein said coating substance is deposited on said conduit surface by a nozzle juxtaposed to said surface.

19. A method as set forth in claim 18, wherein said coating substance is imparted with textured surface by means of a heated plug spaced apart from said nozzle.

20. A method as set forth in claim 1, wherein said coating substance is nonuniformly sprayed onto a surface of said conduit to provide said conduit with a coating having non-uniform thickness.

21. A method as set forth in claim 1, wherein said surface is selected from the group consisting of the interior surface and the exterior surface of said conduit.

* * * * *